United States Patent Office 3,174,896
Patented Mar. 23, 1965

3,174,896
TREATMENT OF SPENT CAUSTIC SOLUTION
Edward V. Partlow, Shelton, Wash., assignor to Rayonier Incorporated, Shelton, Wash., a corporation of Delaware
No Drawing. Filed Dec. 14, 1961, Ser. No. 159,426
5 Claims. (Cl. 162—38)

This invention relates to the alkaline refining of cellulosic materials, such as unrefined wood pulps, and has for its object the provision of a practical and efficient process for the utilization of the relatively dilute spent caustic solutions from the alkaline refining of cellulosic materials containing in solution hemicellulose and other organic material (hereinafter, for convenience, sometimes called "organic matter").

The utilization of these caustic spent refining solutions has not been practical heretofore, either for direct reuse or for recovery of the sodium hydroxide. The solutions cannot be reused for further refining treatment of cellulosic materials because the solubilized organic matter precipitates out on the cellulose being treated. The recovery of sodium hydroxide from solutions containing less than 15 percent of sodium hydroxide is too costly by such practices as dialysis, or by evaporation followed by burning of the organic matter as these operations each have one or more drawbacks such as costly evaporation stages, or requiring expensive and large equipment. It has been proposed to concentrate the solutions by evaporation, then oxidize the concentrated solution with chlorine or hypochlorite until the organic matter becomes insoluble and can be skimmed off but this has not been usccessful because of the costly evaporation, and the colloidal nature of the organic matter making its separation difficult.

This invention is based on my discovery that the controlled oxidation of dilute spent alkaline-refining solutions containing only some 3 to 15 percent of sodium hydroxide and contaminated with organic matter makes it possible to reuse the solution. The organic matter becomes stabilized in solution and does not precipitate out when the solution is added to other cellulose-containing material, and the caustic therein can be reused for refining purposes without contaminating the cellulose.

In carrying out a process of the invention, spent caustic liquor containing organic matter in solution, as an effluent from the alkaline refining of pulp, for example, in producing high alpha cellulose from prehydrolyzed kraft pulp, is subjected to oxidation with chlorine or with sodium hypochlorite in an amount such as to provide from 50 to 100 percent, preferably at least 60 percent, of available chlorine based on the weight of the organic matter. The mixture is then heated to from 80–120° C. with a preferred range of 90–110° C. for from 30 to 120 minutes until all the available chlorine has been used up. The optimum time of treatment, of course, will depend upon the amount of organic matter present, the amount of available chlorine and the temperature used. As soon as the oxidation is completed, the oxidized liquor can then be reused for refining more unrefined pulp to high alpha cellulose as though it were a freshly prepared hemi-free caustic solution of equal concentration.

The following example illustrates the application of the invention in the purification of a kraft-type southern pine pulp into a dissolving grade high alpha pulp. Other applications will be apparent to those skilled in the art.

Example 1

A large sample of sodium hydroxide-containing spent liquor contaminated with dissolved organic matter was procured from a cold caustic extraction stage during the refining of a southern pine prehydrolyzed kraft pulp into a white dissolving grade of cellulose suitable for conversion into tire cord as in the viscose process. Analysis indicated that this effluent liquor contained 5.4 percent of NaOH and 1.15 percent hemicellulose and related organic impurities. The sample was divided into five parts which were labeled A, B, C, D and E. These five samples of effluent were then treated as follows to prepare them for reuse.

(A) This portion was reused without treatment.
(B) This portion was oxidized for 2 hours at 100° C. with sufficient NaOCl to provide 20 percent available $Cl_2$ on the weight of the organic matter.
(C) This portion was treated similarly to (B) except that sufficient NaOCl was used to provide 40 percent available $Cl_2$.
(D) This portion was treated similarly to (B) except that sufficient NaOCl was used to provide 60 percent available $Cl_2$.
(E) This portion was treated similarly to (B) except that sufficient NaOCl was used to provide 88 percent available $Cl_2$.

A large sample of unbleached southern pine prehydrolyzed kraft pulp was procured and divided up into twelve parts for bleaching. Exactly the same procedure was used in each case except that all the caustic required for the bleaching sequences was provided by the foregoing treated effluent solutions. A freshly prepared caustic solution containing exactly 5.4 percent of hemi-free caustic was also used as control. Duplicate bleaches were made in each case and included two stages of hot caustic extraction, etc. The effluents were also used in NaOCl bleach liquor make-up and for the pH control during bleaching. At the end of the bleaching sequence the bleached pulps were analyzed by the standard Tappi methods and the amount of hemicellulose and related organic matter that had precipitated out onto the cellulose during the bleaching sequence determined from the usual caustic-solubility tests. The results are listed in the following table:

Table I

| Effluent Used | Available $Cl_2$ Used in Oxidation (Percent of Organic Matter) | Organic Matter Precipitated During Bleach, Percent |
|---|---|---|
| Control (Fresh NaOH sol.) | [1] 0.0 | [1] 0.0 |
| (A) (No oxidation) | 0.0 | 85.0 |
| (B) | 20.0 | 80.0 |
| (C) | 40.0 | 50.0 |
| (D) | 60.0 | 10.0 |
| (E) | 88.0 | 0.0 |

[1] Each figure represents a duplicate run.

I claim:
1. The process of treating the spent liquor from the alkaline treatment of wood pulp containing hemicellulose matter in solution and from 3 to 15 percent by weight of sodium hydroxide which comprises adding to the liquor a material to provide from 50 to 100 percent by weight of available chlorine based on the weight of the hemicellulose matter in solution, heating the solution to a temperature of from 80 to 120° C. until the available chlorine has been used up, whereby the hemicellulose matter is stabilized in solution and the solution can be reused as an alkaline treating solution for further refining treatment of cellulosic materials.
2. In the process of claim 1, providing at least 60 percent of available chlorine for reaction with the hemicellulose matter, and heating the solution to from 90° to 110° C.

3

3. In the process of claim 1, providing available chlorine in excess of 80 percent of the weight of the hemicellulose matter and heating the solution to from 90 to 110° C. for from 30 to 120 minutes.

4. In the process of claim 1, using as a source of chlorine a material of the group consisting of $Cl_2$ and NaOCl.

5. In the process of claim 1, adding the solution containing stabilized hemicellulose matter to pulp undergoing a refining treatment to utilize the contained sodium hydroxide.

4

References Cited in the file of this patent
UNITED STATES PATENTS

| | | |
|---|---|---|
| 1,872,743 | John | Aug. 23, 1932 |
| 1,880,040 | Richter | Sept. 27, 1932 |
| 1,953,191 | Richter | Apr. 3, 1934 |
| 1,967,347 | Bayerl | July 24, 1934 |
| 1,968,223 | Rosen | July 31, 1934 |
| 2,074,473 | Jayme | Mar. 23, 1937 |
| 2,228,127 | Richter | Jan. 27, 1941 |
| 2,461,105 | Bloch | Feb. 8, 1949 |